United States Patent Office.

WALTER M. JACKSON, OF PROVIDENCE, RHODE ISLAND.

GAS-PROOF CEMENT.

SPECIFICATION forming part of Letters Patent No. 262,427, dated August 8, 1882.

Application filed June 5, 1882. (No specimens.)

*To all whom it may concern:*

Be it known that I, WALTER M. JACKSON, of Providence, in the county of Providence, and in the State of Rhode Island, have invented certain new and useful Improvements in Gas-Proof Cement; and I do hereby declare that the following is a full, clear, and exact description thereof.

This invention has for its object to provide an improved cement for the pipe joints and connections of gas-machines and the various descriptions of hydrocarbon apparatus, in which the joints are required to resist naphtha and the products of petroleum, or petroleum in its natural state.

In carrying out my invention, I employ a compound of glycerine, gelatine, and litharge, or yellow oxide of lead.

The above-mentioned ingredients may be employed in the following proportions, which have been found to answer well in practice generally, viz: glycerine, twenty-four parts; gelatine, one part; litharge, or yellow oxide of lead, thirty parts. These are mixed as required and applied to the joints in the same manner as the ordinary cements, and the connections are made as usual.

It will be found that when the connections are made with the cement above specified the gas or hydrocarbon will have no action thereon, and that a tight joint will be secured wherever the cement is applied.

The cement as prepared hardens in a few hours, and is utterly impervious to and cannot be affected in any manner by the hydrocarbons, either gaseous or liquid, nor by water, either cold or in a boiling or heated condition.

Having thus described my invention, what I claim, and desire to secure by Letters Patent, is—

The cement herein described, consisting of glycerine, gelatine, and litharge, or yellow oxide of lead, combined as specified.

In testimony whereof I affix my signature, in presence of two witnesses, this 27th day of May, 1882.

WALTER MARSH. JACKSON.

Witnesses:
 HOWARD OKIE,
 W. V. PHILLIPS.